(12) United States Patent
Nielsen

(10) Patent No.: US 8,301,330 B2
(45) Date of Patent: Oct. 30, 2012

(54) METHOD AND SYSTEM FOR PROVIDING SUPPLEMENTAL SERVICES TO TELEMATICS SYSTEMS

(75) Inventor: Benjamin Jason Nielsen, Prior Lake, MN (US)

(73) Assignee: General Electric Company, Schenectady, NY (US)

( * ) Notice: Subject to any disclaimer, the term of this patent is extended or adjusted under 35 U.S.C. 154(b) by 525 days.

(21) Appl. No.: 12/434,268

(22) Filed: May 1, 2009

(65) Prior Publication Data

US 2009/0287369 A1    Nov. 19, 2009

Related U.S. Application Data

(60) Provisional application No. 61/126,328, filed on May 2, 2008.

(51) Int. Cl.
*G01M 17/00* (2006.01)
(52) U.S. Cl. ............... 701/29.1; 701/31.5; 701/32.4; 701/32.7; 701/33.2
(58) Field of Classification Search ............ 701/29.1, 701/29.2, 29.3, 31.5, 32.4, 32.7, 33.2; 705/5
See application file for complete search history.

(56) References Cited

U.S. PATENT DOCUMENTS

| | | | |
|---|---|---|---|
| 5,416,468 A | 5/1995 | Baumann | |
| 5,424,720 A | 6/1995 | Kirkpatrick | |
| 5,694,318 A | 12/1997 | Miller | |
| 5,825,286 A | 10/1998 | Coulthard | |
| 5,844,473 A | 12/1998 | Kaman | |
| 5,928,292 A | 7/1999 | Miller | |
| 5,959,577 A | 9/1999 | Fan | |
| 6,038,542 A | 3/2000 | Ruckdashel | |
| 6,094,681 A | 7/2000 | Shaffer | |
| 6,108,537 A | 8/2000 | Comer | |
| 6,141,611 A | 10/2000 | Mackey | |
| 6,161,071 A | 12/2000 | Shuman | |
| 6,240,365 B1 | 5/2001 | Bunn | |
| 6,505,106 B1 | 1/2003 | Lawrence | |
| 6,510,383 B1 | 1/2003 | Jones | |
| 6,539,307 B1 | 3/2003 | Holden | |
| 6,542,077 B2 | 4/2003 | Joao | |
| 6,556,904 B1 | 4/2003 | Larson | |
| 6,594,576 B2 | 7/2003 | Fan | |
| 6,594,579 B1 * | 7/2003 | Lowrey et al. | ............... 701/123 |
| 6,616,036 B2 | 9/2003 | Streicher | |
| 6,691,116 B1 | 2/2004 | Bart | |

(Continued)

OTHER PUBLICATIONS

Dr. Axel Georg, Dr. Martin Fritz, Robert Bosch GmbH, Plochingen, Integrated Diagnostic Concepts for the Vehicle Life-Cycle, pp. 1-16, Apr. 24, 2007.

(Continued)

*Primary Examiner* — Toan To
(74) *Attorney, Agent, or Firm* — GE Global Patent Operation; John A. Kramer

(57) ABSTRACT

The embodiments of the present innovation provide a method and system for providing supplemental services to telematics systems. The method and system receives data from a telematics provider in a non-proprietary format, parses the data, stores the data, provides the data to a third party application, obtains an output from the third party application, and transmits the output to a customer. The method and system may also receive data from any portable device, parse the data, store the data, provide the data to a third party application, obtain an output from the third party application, and transmit the output to a customer.

40 Claims, 3 Drawing Sheets

U.S. PATENT DOCUMENTS

| | | | |
|---|---|---|---|
| 6,694,359 B1 | 2/2004 | Morris | |
| 6,714,857 B2 | 3/2004 | Kapolka | |
| 6,732,031 B1 | 5/2004 | Lightner | |
| 6,745,153 B2 | 6/2004 | White | |
| 6,748,211 B1 | 6/2004 | Isaac | |
| 6,762,684 B1 | 7/2004 | Camhi | |
| 6,807,485 B1 | 10/2004 | Green | |
| 6,839,597 B2 | 1/2005 | Hattori | |
| 6,864,779 B2 | 3/2005 | Stack | |
| 6,892,546 B2 | 5/2005 | Singh | |
| 6,988,033 B1 | 1/2006 | Lowrey | |
| 7,027,808 B2 | 4/2006 | Wesby | |
| 7,043,255 B1 | 5/2006 | Tiwari | |
| 7,092,803 B2 | 8/2006 | Kapolka | |
| 7,155,321 B2 * | 12/2006 | Bromley et al. | 701/29.6 |
| 7,165,040 B2 | 1/2007 | Ehrman | |
| 7,200,633 B2 | 4/2007 | Sekiguchi | |
| 7,209,041 B2 | 4/2007 | Hines | |
| 7,245,951 B2 | 7/2007 | Oesterling | |
| 7,252,230 B1 | 8/2007 | Sheikh | |
| 7,265,668 B1 | 9/2007 | Brosius | |
| 7,267,279 B2 | 9/2007 | Melick | |
| 7,286,158 B1 | 10/2007 | Griebenow | |
| 7,336,181 B2 | 2/2008 | Nowak | |
| 7,383,250 B2 | 6/2008 | Scian | |
| 7,385,476 B2 | 6/2008 | Bridgelall | |
| 7,388,491 B2 | 6/2008 | Chand | |
| 7,394,372 B2 | 7/2008 | Gloekler | |
| 7,397,358 B2 | 7/2008 | Boothroyd | |
| 7,418,252 B2 | 8/2008 | Erskine | |
| 7,423,527 B2 | 9/2008 | Bajwa | |
| 7,433,922 B2 | 10/2008 | Engstrom | |
| 7,441,706 B1 | 10/2008 | Schuessler | |
| 7,468,661 B2 | 12/2008 | Petite | |
| 7,480,563 B2 | 1/2009 | Ichimura | |
| 7,484,662 B2 | 2/2009 | Schmidtberg | |
| 7,486,198 B2 | 2/2009 | Van Der Veen | |
| 7,487,019 B2 | 2/2009 | Estes | |
| 7,487,106 B2 | 2/2009 | Levine | |
| 7,487,204 B2 | 2/2009 | Asthana | |
| 7,492,254 B2 | 2/2009 | Bandy | |
| 7,493,198 B2 | 2/2009 | Sonnenrein | |
| 7,502,672 B1 | 3/2009 | Kolls | |
| 7,502,673 B2 | 3/2009 | Robinson | |
| 7,584,298 B2 * | 9/2009 | Klinker et al. | 709/238 |
| 2004/0083281 A1 | 4/2004 | Makagon et al. | |
| 2004/0138790 A1 * | 7/2004 | Kapolka et al. | 701/29 |
| 2004/0167689 A1 * | 8/2004 | Bromley et al. | 701/29 |
| 2005/0157856 A1 | 7/2005 | Humphries | |
| 2006/0069503 A1 | 3/2006 | Suomela et al. | |
| 2007/0161402 A1 | 7/2007 | Ng et al. | |
| 2007/0173991 A1 | 7/2007 | Tenzer et al. | |
| 2007/0173993 A1 | 7/2007 | Nielsen | |
| 2007/0174004 A1 | 7/2007 | Tenzer et al. | |
| 2007/0203637 A1 | 8/2007 | Passman et al. | |
| 2007/0294002 A1 | 12/2007 | Underdal | |
| 2008/0162193 A1 | 7/2008 | Voggenauer | |
| 2008/0294384 A1 | 11/2008 | Fok | |
| 2008/0306651 A1 | 12/2008 | Davis | |
| 2009/0043441 A1 | 2/2009 | Breed | |
| 2009/0079555 A1 | 3/2009 | Aguirre De Carcer | |

OTHER PUBLICATIONS

ASAM Standardization to Support Diagnostics, GM Tech Day, Pontiac, MI, Jun. 14, 2004, pp. 1-13.
Ali Karimi, Johan Olsson & Johan Rydell, A Software Architecture Approach to Remote Vehicle Diagnostics, 2004, pp. 1-90.
Vishal Singh, Henning Schulzrinne, Piotr Boni, Vehicle Int, o Event Package, 2007, pp. 1-8, (Mar. 2007).

* cited by examiner

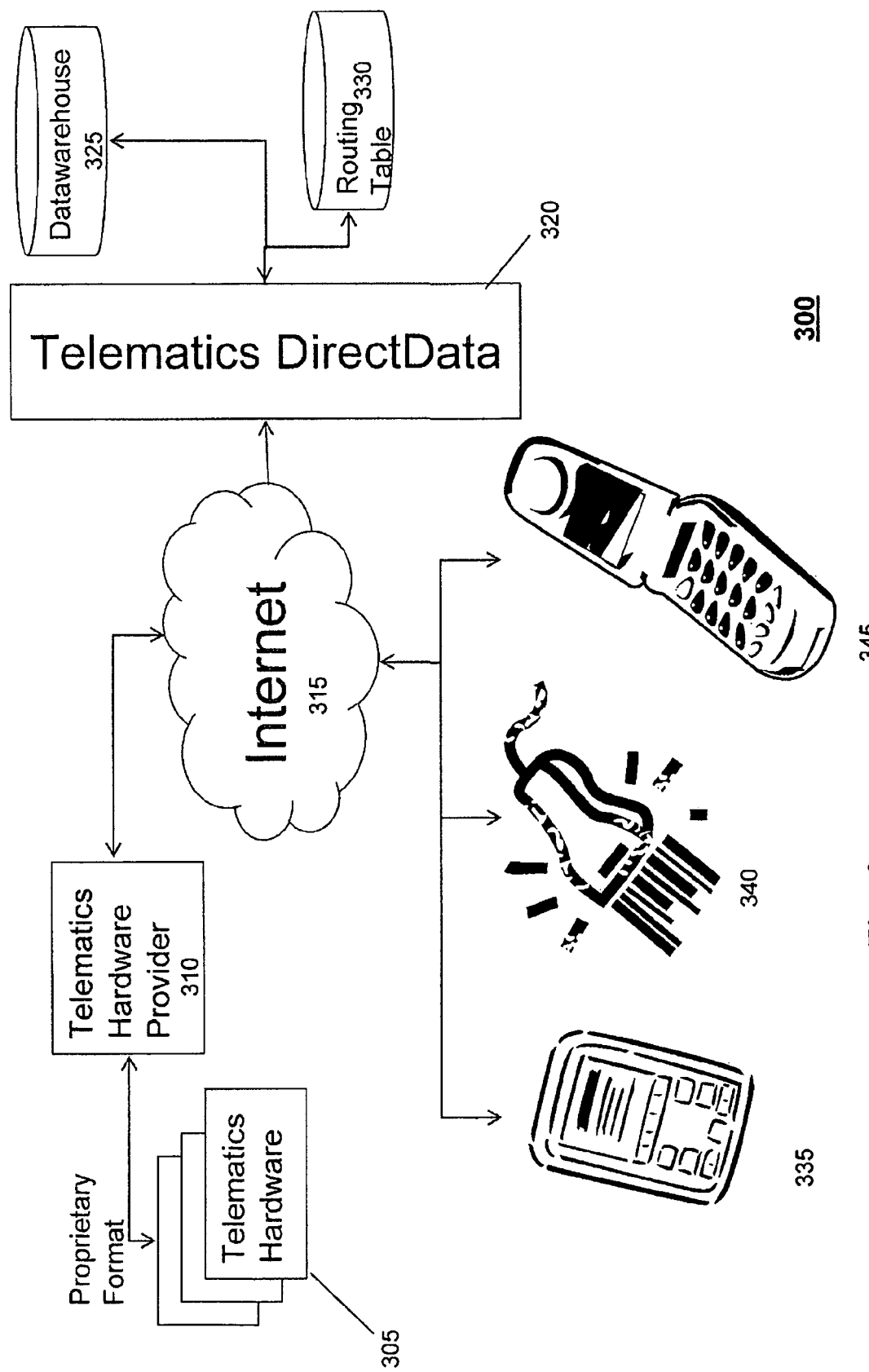

METHOD AND SYSTEM FOR PROVIDING SUPPLEMENTAL SERVICES TO TELEMATICS SYSTEMS

CROSS-REFERENCE TO RELATED APPLICATIONS AND PREVIOUSLY FILED APPLICATIONS

This application claims priority to U.S. Provisional Patent Application 61/126,328 filed on May 2, 2008, entitled "METHOD AND SYSTEM FOR PROVIDING SUPPLEMENTAL SERVICES TO TELEMATICS SYSTEMS," and herein incorporates by reference in its entirety.

This application incorporates by reference in their entirety four previously filed applications: United States Patent Application Publication No. 20070173991, filed on Jan. 23, 2006, entitled, "System and method for identifying undesired vehicle events;" United States Patent Application Publication No. 20070173993, filed on Jan. 23, 2006, entitled, "Method and system for monitoring fleet metrics;" United States Patent Application Publication No. 20070203637, filed on Jan. 23, 2006, entitled, "System and method for identifying operational usage of fleet vehicles related to accident prevention;" and United States Patent Application Publication No. 20070174004, filed on Jan. 23, 2006, entitled, "System and method for identifying fuel savings opportunity in vehicles."

BACKGROUND

The telematics industry is advancing very rapidly because businesses are becoming more mobile and employing more mobile assets. Companies with a large number of mobile assets frequently track their mobile assets in order to efficiently manage them. One of the areas that is becoming increasingly important in mobile asset management is the exchange of information. The exchange of information allows business owners to obtain information regarding the mobile assets, such as mileage, location, diagnostics, fuel, etc. The exchange of information can be between the mobile assets and the asset managers, between mobile assets and other mobile assets, or between mobile assets and other entities that provide asset management or information services. Furthermore, the exchange of information may be between portable devices and asset managers to provide further services to the mobile asset owners or customers.

In a typical telematics system, the telematics hardware is a proprietary system that communicates information (e.g., vehicle location, diagnostic information, device specific information, etc.) in a proprietary format. The proprietary nature of existing telematics systems generally limits communications to communications between an asset, a user (customer), and the telematics provider; communication of information to third parties is not typical. In order for a third party to communicate with these proprietary telematics systems, the third party must typically implement costly and complex software to enable communications with existing proprietary software. Moreover, different types of software are needed for each type of proprietary system.

Thus, there is a need for a solution and method for more easily exchanging telematics information that is inclusive of vehicle information, global positioning system (GPS) information, and other information that is relevant to telematics solutions.

BRIEF DESCRIPTION OF THE DRAWINGS

The method and system for providing supplemental services are further described with reference to the accompanying drawings in which:

FIG. 3 is a diagram showing an exemplary embodiment of the invention including multiple types of devices.

DETAILED DESCRIPTION OF THE EMBODIMENTS

The embodiments of the present invention relate to a method and system for providing supplemental services to telematics systems.

The method and system for providing supplemental services to telematics systems may be used in conjunction with any existing telematics system (hardware and software) already used for one or more assets. In one exemplary embodiment, telematics data needed for the supplemental services may be received by a third party provider of supplemental services directly from a telematics hardware provider, OEM, or any other data provider via a business-to-business (B2B) exchange of information using a predetermined data format such as Extensible Markup Language (XML). The data may then be processed and/or analyzed by the third party provider of supplemental services, or the data may be routed to other third party providers of supplemental services, or the data may be routed to one or more customers. Data routed to third parties or customers may be reformatted to the particular data format preferred by the third parties or customers.

In another exemplary embodiment, the system comprises one or more telematics hardware devices, one or more telematics hardware providers, and one or more telematics directdata processes. A telematics directdata process may act as a data receiving, processing, and/or routing tool for the exchange of telematics data that may be in multiple formats or contain multiple attributes. In another exemplary embodiment, a telematics directdata process may provide functionality above and beyond telematics by integrating additional information or data with telematics data, then routing that additional data and/or telematics data to a third party of supplemental services or to a third party application that uses the data to provide supplemental services, to provide better analysis and functionalities to customers. One exemplary embodiment may be illustrated by FIG. 1. In accordance with the following description, a technical effect of the system 100 is to receive telematics data, process and/or route the telematics data.

Figure 1:
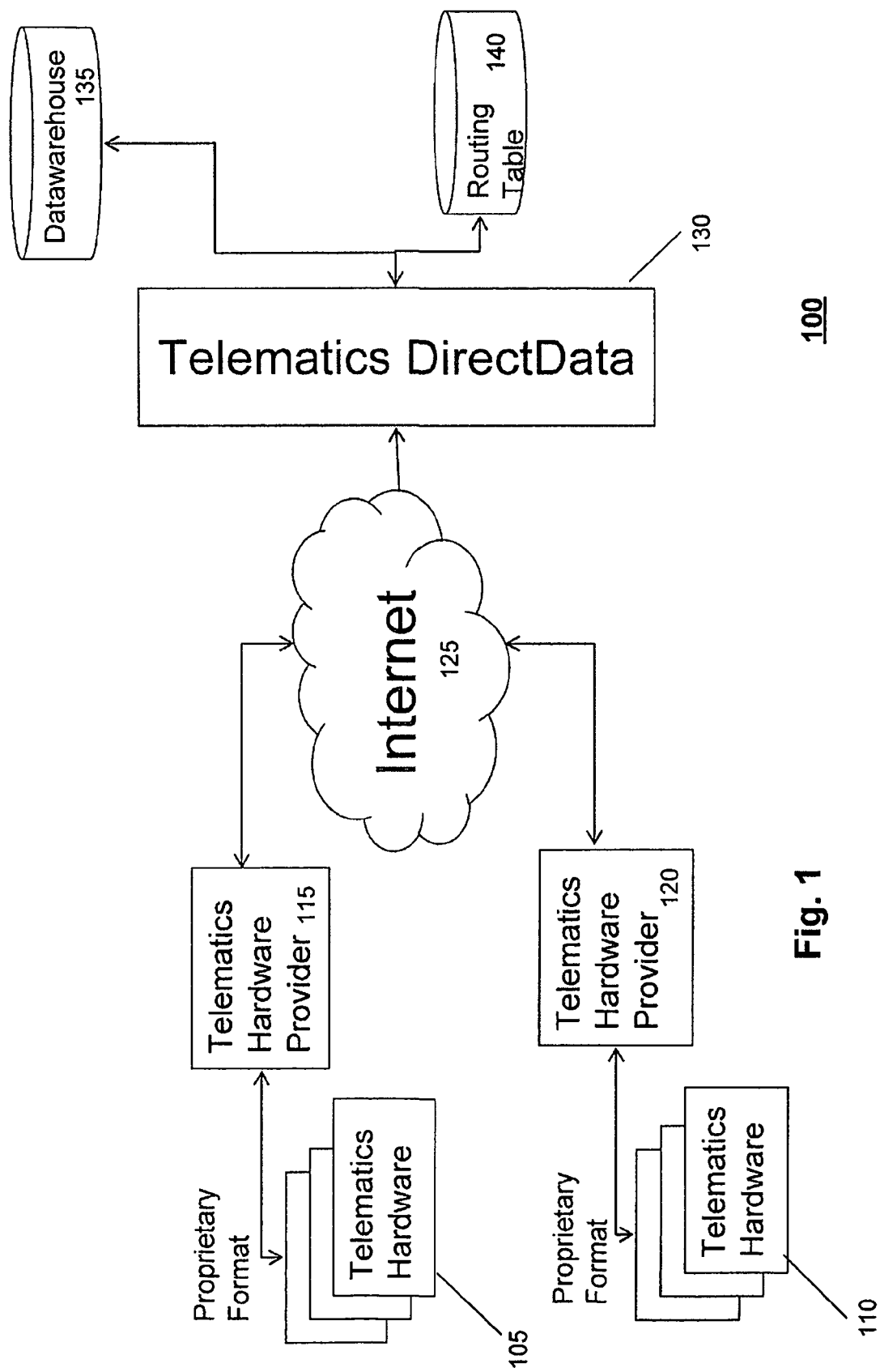
FIG. 1 is a diagram showing an exemplary embodiment of the invention.

FIG. 1 illustrates an exemplary embodiment of the method and system for providing supplemental services to telematics systems. As shown in FIG. 1, the system 100 may comprise one or more telematics hardware devices 105 and 110. Telematics hardware devices typically include GPS functionality, and may also include functionality to obtain diagnostics data from an asset or data relating to other sensors on an asset such as cargo sensors, door sensors, and temperature sensors. The four applications incorporated by reference herein describe functions that may be performed using data from telematics hardware devices. The telematics hardware devices 105 and 110 may transmit and/or receive data to and/or from their corresponding telematics hardware provider 115 and 120 in proprietary formats. Each telematics hardware provider may have its own proprietary data format, and these proprietary data formats may be different from one telematics hardware provider to another.

As further shown in FIG. 1, the telematics hardware provider 115 and 120 may transmit and/or receive data to and/or from the telematics directdata process 130 through a network 125. Network 125 may be any type of network such as local area network (LAN), wide area network (WAN), wireless network, the internet, or any other types of network that may be used for transmitting and/or receiving data. In this exemplary embodiment, the network 125 is the internet. Any type of telematics data may be transmitted by the telematics hardware to or from the telematics provider. For example, the telematics data may include speed or location data, diagnostics data such engine temperature, asset fuel level, and diagnostic trouble codes typical in vehicles, and data related to other sensors on an asset that are not part of the vehicle's diagnostic system.

When the telematics hardware providers 115 and 120 transmit data through the network 125, the data is transmitted in a specified directdata format. The directdata format may be any data format predetermined or agreed upon between the telematics hardware providers and the telematics directdata process 130. For example, the telematics directdata format may be non-proprietary, such as XML. The telematics directdata process 130 may reside on a computer, microprocessor, server or any other devices with computing capabilities. In an exemplary embodiment, the telematics directdata process 130 may reside on a server with one or more storage medium. The software that is required for the telematics directdata process 130 may be stored in the storage medium. The telematics directdata process may comprise one or more application programming interface (API) and/or any other software. In addition, the storage medium may also store one or more databases such as the datawarehouse 135 and routing table 140. However, the datawarehouse 135 and the routing table 140 may not necessarily reside on the same server as the telematics directdata process 130. The datawarehouse 135 or the routing table 140 may be stored in separate servers, computers, or storage mediums, even at one or more remote locations. If the datawarehouse 135 or the routing table 140 is located at a remote location, the telematics directdata process 130 may communicate with the datawarehouse 135 or the routing table 140 through any wired or wireless communication network. For example, a LAN, WAN or the internet may be utilized.

After the telematics directdata process 130 receives data in the predetermined directdata format from the telematics hardware providers, the telematics directdata process 130 may begin processing the data. For example, the telematics directdata process 130 may parse the data, then store the data in datawarehouse 135. For example, if the telematics directdata process 130 receives data in XML format, the directdata process 130 may then parse the data according to the XML attributes, then store the data in the datawarehouse 135 according to the structure of the datawarehouse 135. For example, datawarehouse may comprise one or more relational databases, and the telematics directdata process 130 may update one or more databases with the data that has been parsed. In addition to receiving data from the telematics hardware providers, the system may also receive additional data from one or more customers that is necessary to perform certain analyses.

The telematics directdata process 130 may also route data to third-party applications (not shown) that perform analysis to the telematics data. The application or applications may be local to the directdata process server or computer, or the application may be located remotely and the data transmitted to the remote location via a suitable connection such as a LAN, WAN, or the internet. By way of example, an application may perform statistical analysis based on data it receives from the datawarehouse 135. Such statistical analysis may include fuel consumption, distance traveled, average speed, arrival statistics, etc. Alternatively, the application may be able to retrieve data from the datawarehouse 135 as needed to perform the statistical analysis or other function that is performed by the application.

For example, the telematics directdata process 220 may route the data to third party applications according to the instructions stored in the routing table 225 or the datawarehouse 135. In one embodiment, the telematics directdata process 220 may transmit the data through the network 230 to third party applications 240 in the predetermined data format or other data format specified in the routing table 225 or datawarehouse 135. The third party applications 240 may reside on the datawarehouse 135, or the third party applications may reside on other servers or computers locally or remotely. After the third party applications 240 have performed analysis or data processing, the third party applications 240 may transmit the output of the application, the additional services, to the customers directly, or the output can be made available to the customers through a user interface such as through the Internet. This interface can be through an interface for the third party application specifically, or even through an interface used by the existing telematics provider, in which case the output is sent to the provider. These customer preferences may be stored in the routing table 225 or datawarehouse 135 such that the telematics directdata process 220 may route data according to the stored customer preferences. Multiple third party applications may be sent data or may be allowed to obtain data from the datawarehouse through the directdata process. For example, an exemplary third party application may handle accident reports and another exemplary third party application may handle fuel efficiency analysis. Other third party applications may determine safety conditions or provide statistical analysis regarding the safety conditions of a particular asset. Other examples of third party applications may include applications that analyze performance of an asset, desirable and undesirable vehicle events, vehicle routing or vehicle scheduling. Examples of third party applications may also include, but not limited to, third party applications that determine modifiable conditions related to safety, modifiable use conditions related to fuel economy, performance indicator for an asset, undesired vehicle events, optimal routing of vehicles, optimal schedule of service stops. Exemplary output of the third party applications may include, but not limited to, statistical metrics of the relatively safety of an asset or fleet, statistical metrics of the relatively fuel economy of an asset or fleet, actionable metrics that affect the performance indicator, undesired vehicle events of an asset or fleet, directions showing the optimal routing of a vehicle in a fleet, or a schedule of service stops for a vehicle or fleet.

Datawarehouse 135 may store additional information that may be used in performing further analysis of data received from customers, telematics providers, or other sources such as other devices that are able to communicate with the directdata process server. For example, the datawarehouse 135 may include data such as expected vehicle stops for deliveries, stop times, load, etc. That data may be used by third party applications to perform fleet scheduling and/or routing optimization, i.e. the application may analyze the additional data regarding vehicle stops, stop times, load, etc. and the telematics data regarding location, speed, etc. and calculate the optimal schedule and route for that particular vehicle. In another exemplary embodiment, vehicle data such as fuel level, speed, and/or location may be integrated with other data such as fuel card purchases, accident data, scheduling data and/or routing data to provide better route planning, scheduling, and/or fuel efficiency analysis.

The additional data may be provided by one or more customers using any data transfer techniques and/or protocols. For example, the additional data may be uploaded by the customer using file transfer protocol (FTP), or alternatively, a user interface may be provided for the customer to enter the additional data. In one embodiment, the customer may be able to upload that data directly to the third party in possession of the datawarehouse 135 through the directdata process. In another embodiment, the customer may upload the data to the existing telematics provider, which then transmits the data to the datawarehouse 135 through the directdata process.

In addition, the system 100 may also comprise a routing table 140. In an exemplary embodiment, the routing table 140 may be stored in one or more databases. The routing table 140 may store information regarding how the data should be transmitted. For example, the routing table may include information such as the data format to be used for transmission, the frequency of the data transfers, the destination for the data, any encryption that may be used in transmitting or receiving data, etc. In other words, the data in the routing table 140 may provide information to instruct the telematics directdata process 130 on how the data should be transmitted, where the data should be transmitted, how often the data should be transmitted, what types of data should be transmitted, how the data should be encrypted, etc.

Figure 2:
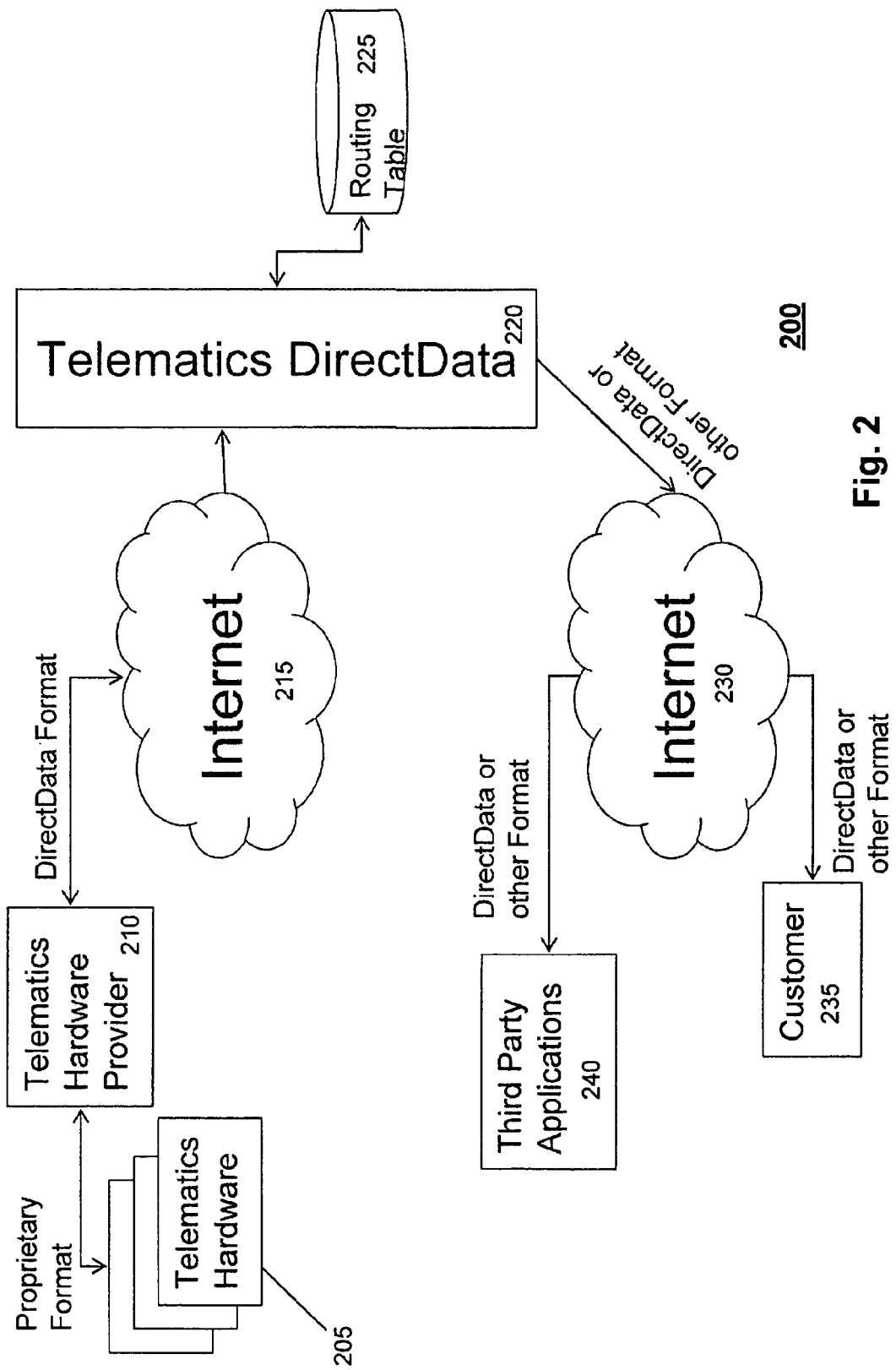
FIG. 2 is a diagram showing an exemplary embodiment of the invention.

Another exemplary embodiment of the system and method of providing supplemental services to telematics systems may be illustrated by the diagram shown in FIG. 2. As shown in FIG. 2, the system 200 may comprise one or more telematics hardware devices 205, one or more telematics hardware providers 210, one or more networks 215 and 230, one or more telematics directdata process 220, one or more routing tables 225, one or more third party applications 240, and one or more customers 235. In this exemplary embodiment, each telematics hardware device 205 may transmit and/or receives data to and/or from its corresponding telematics hardware provider 210. The data received from or transmitted to the telematics hardware provider 210 may be in one or more proprietary data formats. Each telematics hardware provider may have its own proprietary data formats and different from other telematics hardware providers.

As further shown in FIG. 2, the telematics hardware provider 210 may transmit and/or receive data to and/or from the telematics directdata process 220 through a network 215. The network may be any wired or wireless network that has data transfer capabilities. For example, a LAN, WAN, the internet, or any other network may be used. The telematics hardware provider 210 may receive or transmit data in a specified predetermined directdata format. The directdata format may be any data format predetermined or agreed upon; for example, the predetermined directdata format may be XML format.

After the telematics directdata process 220 receives data in the predetermined directdata format, the telematics directdata process 220 may then process the data. For example, the telematics directdata process 130 may parse the data, then store the data in datawarehouse 135. For example, if the telematics directdata process 130 receives data in XML format, the directdata process 130 may then parse the data according to the XML attributes, then store the data in the datawarehouse 135 according to the structure of the datawarehouse 135. The datawarehouse may comprise one or more relational databases, and the telematics directdata process 130 may update one or more databases with the data that has been parsed. Then the telematics directdata process 130 may also route data to customers or third-party applications through a network 230. Similar to the network 215, the network 230 may be any wired or wireless network capable of transferring data. In this example, the network 230 is the internet, but any other types of network may be used. In addition, although the example shows third party application being remote from the telematics directdata process, the application or applications may be local to the directdata process server or computer, or some applications may be local and some may be remote. As an example, one the third party application may be local and provide statistical reports based on accident data received and/or stored, while another third party application that is remote may provide fuel usage statistics, average speed, schedule adherence evaluation, and other types of data analysis.

Continuing the exemplary illustration in FIG. 2, the routing table 225 may store information regarding how the data should be transmitted. For example, the routing table 225 may contain information such as data format, destination, frequency of data transfer, types of data being transferred, etc. In other words, the routing table may provide instructions for the telematics directdata process 220 regarding how the data should be transmitted, where the data should be transmitted, what types of data should be transmitted, in what data format the data should be transmitted, how often the data should be transmitted, etc. The routing table 225 may reside in one or more databases, and may reside on the same computer or server as the telematics directdata process 220, or the routing table 225 may reside on a different computer or server, or, as another alternative, the routing table 225 may be stored at one or more remote locations. If the routing table 225 is stored at a remote location, the telematics directdata process 220 may communicate with the routing table 225 through any wired or wireless network. For example, a LAN, WAN, the internet or any other data transfer network may be used.

The telematics directdata process 220 may transmit the processed data through the network 230 to one or more destinations specified in the routing table 225. For example, the telematics directdata process 220 may transmit the processed data through the network 230 to one or more customers 235 and/or one or more third party applications 240. Alternatively, the telematics directdata process 220 may transmit the processed data back to one or more telematics hardware providers 210. The telematics directdata process 220 may transmit the data in the predetermined directdata format, or the telematics directdata process 220 may convert the data into other formats as specified in the routing table 225.

For example, the customer 235 may have a preferred data format that the customer may prefer to receive data in. In one example, the predetermined directdata format may be XML format, and the customer 235 may prefer to receive data in binary. Thus, the telematics directdata process 220 may convert and/or encode the data from XML format to binary before transmitting the data to customer 235. In addition, the telematics directdata process 220 may also encrypt the data before transmitting to provide further data integrity and security measures. The routing table 225 may store information as to how the customer 235 may prefer the data to be encrypted. For example, if the customer 235 may prefer the data to be encrypted using a particular algorithm, the telematics directdata process 220 may read the encryption instruction from the routing table 235, then encrypt the data with the algorithm specified in the routing table 235, and transmit the data to the customer 235.

Similar to the datawarehouse 135, data stored in the routing table 235 may be provided by one or more customers using any data transfer techniques and/or protocols. For example, the routing table data may be uploaded by the customer using file transfer protocol (FTP), or alternatively, a user interface may be provided for the customer to enter the routing table data. In another alternative, a user interface may be provided by the existing telematics provider for the customer to upload data.

In addition to customers 235, the telematics directdata process 220 may transmit data to one or more third party applications 240 as specified in the routing table 225. The third party applications 240 may reside on the same computer or server as the telematics directdata process 220 or otherwise locally to the directdata process through a LAN; alternatively, the third party applications 240 may reside on a different computer or server as the telematics directdata process 220 or even at one or more remote locations. Moreover, a number of third party applications 240 may reside on the same computer or server as the telematics directdata process 220 while other third party applications 240 may reside on different computers, servers, or at one or more remote locations.

The telematics directdata process 220 may transmit data in the predetermined directdata format, or as an alternative, the telematics directdata process 220 may convert and/or encode the data from the predetermined directdata format to another format before transmitting the data. For example, the predetermined directdata format may be XML format, and the third party application 240 may prefer data input in plain text format. The telematics directdata process 220 would then convert and/or encode the data from XML format to plain text format. In addition, the telematics directdata process 220 may also encrypt the data before transmitting to provide further data integrity and security measures.

Any third party applications may be used in the system 200. For example, scheduling applications, usage optimization applications, route optimization applications, diagnostics evaluation applications alert applications, etc. may be used. After the third party applications perform further processing and/or analysis to the data, the processed data and/or data output may be transmitted to the customer 235. Alternatively, a user interface may be provided for the customer to access the processed data and/or data output.

Furthermore, the telematics directdata process 220 may transmit data back to the telematics hardware provider 210 as specified in the routing table 225. The telematics directdata process 220 may transmit data back to the telematics hardware provider 210 through the network 215, and as previously discussed, the network 215 may be any wired or wireless network with data transfer capabilities. For example, a LAN, WAN, the internet or any other data transfer network may be used.

The telematics directdata process 220 may transmit data to the telematics hardware provider 210 in the predetermined directdata format, or as an alternative, the telematics directdata process 220 may convert and/or encode the data from the predetermined directdata format to another format specified in the routing table 225 before transmitting the data. For example, the predetermined directdata format may be XML format and the telematics hardware provider 210 may prefer data input in its own proprietary format. The telematics directdata process 220 would then convert and/or encode the data from XML format to the proprietary format. In addition, the telematics directdata process 220 may also encrypt the data before transmitting to provide further data integrity and security measures.

In another exemplary embodiment, the telematics directdata process 220 may process and transmit data in "real-time," i.e. the telematics directdata process 220 may process and transmit data as the telematics directdata process 220 receives the data. In other words, immediately after the telematics directdata process 220 receives the data, the telematics directdata 220 may process and transmit the data. In another exemplary embodiment, the telematics directdata 220 may process and transmit data according to a particular schedule as defined by the customer and stored in the routing table 225 or datawarehouse 135. For example, the customer may prefer to receive data every two hours. In this case, the instruction (to send data every two hours) may be stored in the routing table 225 or datawarehouse 135, and the telematics directdata process 220 may process and transmit data for this customer every two hours. In another exemplary embodiment, the telematics directdata process 220 may process data immediately after the data is received, stored the processed data or data output but only transmit the processed data or data output according to a schedule defined by the customer and stored in the routing table 225 or datawarehouse 135. In another example, the telematics directdata 220 may process data whenever resources in the computing device or server is available, store the processed data or data output, and transmit the processed data or data output at a certain time of the day as defined by the customer and stored in the routing table 225 or datawarehouse 135. The customer may define any type of schedule of receiving data according to its preference. Furthermore, the customer may define different schedule for different types of vehicles, devices or data analysis. For example, the customer may prefer to receive processed data every three hours for tractors but receive processed data for reefers every hour. As another example, the customer may prefer to receive fuel usage statistics every week but receive accident reports every month. Any customer preference may be stored in the routing table 225 or datawarehouse 135, and the telematics directdata 220 may process data according to the preferences stored.

Another exemplary embodiment may be illustrated in FIG. 3. As shown in FIG. 3, the system and method for providing supplemental services to telematics systems may receive and/or transmit data to and/or from not just telematics hardware, but also various other devices. Following FIG. 3, the system 300 may comprise one or more telematics hardware devices 205, one or more telematics hardware providers 310, one or more devices 335, 340 and 345, one or more networks 315, one or more telematics directdata processes 320, one or more datawarehouses 325, and one or more routing tables 330.

Similar to the exemplary embodiment shown in FIG. 2, in the exemplary embodiment of FIG. 3, the telematics hardware 305 transmits and/or receives data to and/or from its corresponding telematics hardware provider 310. The data received from or transmitted to the telematics hardware provider 310 may be in one or more proprietary data formats. Each telematics hardware provider may have its own proprietary data formats and different from other telematics hardware providers.

As further shown in FIG. 3, the telematics hardware provider 310 may transmit and/or receive data to and/or from the telematics directdata process 320 through a network 315. The network may be any wired or wireless network that has data transfer capabilities. For example, a LAN, WAN, the internet, or any other network may be used. The telematics hardware provider 310 may receive or transmit data in a specified predetermined directdata format. The directdata format may be any data format predetermined or agreed upon; for example, the predetermined directdata format may be XML format.

Continuing the exemplary embodiment illustrated in FIG. 3, other types of devices 335, 340, 345 may also transmit and/or receive data to and/or from the telematics directdata process 320 through the network 315. Any types of devices that are capable of transmitting and/or receiving data may be used. For example, the devices may be personal navigation devices (PND), RFID devices, cellular phones, personal digital assistant devices (PDAs), bar code scanners, and any other devices that have communication capabilities. In addition, devices with short range communication capabilities, such as radio or Bluetooth, may also be used in the system 300 by communicating with other devices with long range communication capabilities. For example, a device with only short range Bluetooth capabilities may communicate using Bluetooth with a cellular phone, and the cellular phone may then communicate the information with the telematics directdata process 320 through the network 315.

The devices 335, 340, and 345 may receive or transmit data in a specified predetermined directdata format, or alternatively, the devices 335, 340, and 345 may receive or transmit data in any formal, including any proprietary formats. The specified data format may be stored in the routing table 330 or datawarehouse 325, such that the telematics directdata process 320 may process the received data according to the particular format specified in the routing table 330 or datawarehouse 325. For example, the device 335 may transmit data to the telematics directdata process 320 in a proprietary format A; the device 340 may transmit data to the telematics directdata process 320 using binary format; and the device 345 may transmit data to the telematics directdata process 320 using XML. Upon receipt of the data, the telematics directdata process 320 may look up the device in the datawarehouse 325 or routing table 330, then decode or parse the data received from device 335 according to the proprietary format A, decode or parse the data received from device 340 according to the binary format, and decode or parse the data received from device 345 according to the XML format.

After the telematics directdata 320 decodes or parses the data received from telematics hardware provider 310, devices 335, 340 or 345, the telematics directdata process 320 may store the data in the datawarehouse 325, process the data according to the instructions stored in the datawarehouse 325 or the routing table 330, and transmit the data according to the instructions stored in the datawarehouse 325 or routing table 330.

The telematics directdata process 320 may integrate data received from the telematics hardware provider 310 and data received from other devices 335, 340, and 345 and provide further analysis. For example, the telematics directdata process 320 may receive telematics data such as speed, location, diagnostics, etc. from the telematics hardware provider 310 and other data from the devices 335, 340 and 345 such as inventory information, product information, employee schedules, work schedules etc. After gathering the data from the telematics hardware provider 310 and the devices 335, 340 and 345, the telematics directdata process 320 may analyze the received data and provide analysis such as whether work vehicles have reported to work sites on time, whether particular deliveries arrived on time, or other statistical report or analysis.

In a different exemplary embodiment, the devices 335, 340 or 345 may act as a substitute for telematics hardware 305. For example, many devices such as Personal Navigation Devices, mobile phones, and PDAs are GPS-enabled and can provide location-related information. Thus, these devices can be used as a substitute source for obtaining certain telematics data, and can be used in place of telematics hardware 305 or as a back up to telematics hardware in case of failure. For example, if the telematics hardware 305 fails for any reason, the telematics directdata process 320 may still remain in communication with other devices 335, 340, or 345 and may be able to obtain useful data from other devices that may be carried by the personnel within the vehicle. In another example, these devices can be used in lieu of telematics hardware 305.

Similar to the system illustrated in FIG. 1, in addition to the data received from the telematics hardware provider 310 and the data received from devices 335, 340 and 345, the datawarehouse 325 and/or routing table 330 may store additional information that may be used in performing further analysis of the telematics data. The telematics directdata process 320 may then integrate all different types of data received from the telematics hardware provider 310, the devices 335, 340 or 345, and the additional information stored in the datawarehouse 325 or routing table 330, and provide further supplemental analysis of data and services for the customers.

After the data is processed, the telematics directdata process 320 may then transmit the processed data through a network 315. The network 315 may be any wired or wireless network capable of transferring data. In this example, the network 315 is the internet, but any other types of network may be used. In addition to sending data to third party applications, customers or telematics hardware providers, as illustrated in FIG. 2, the telematics directdata process 320 may send data to other devices 335, 340 or 345. For example, the telematics directdata process send alert data to a supervisor's PDA, cellular phone or pager.

The telematics directdata process 320 may transmit the data in the predetermined directdata format, or the telematics directdata process 320 may convert the data into other formats as specified in the routing table 330. For example, the particular device may only receive data in binary format. In this case, the telematics directdata process 320 may convert the data to binary format before sending the data to the device.

Examples of the types of additional telematics services that may be provided by the system and method of the invention are shown in four applications previously filed by the Applicant: United States Patent Application Publication No. 20070173991, filed on Jan. 23, 2006, entitled, "System and method for identifying undesired vehicle events;" United States Patent Application Publication No. 20070173993, filed on Jan. 23, 2006, entitled, "Method and system for monitoring fleet metrics;" United States Patent Application Publication No. 20070203637, filed on Jan. 23, 2006, entitled, "System and method for identifying operational usage of fleet vehicles related to accident prevention;" and United States Patent Application Publication No. 20070174004, filed on Jan. 23, 2006, entitled, "System and method for identifying fuel savings opportunity in vehicles." As noted above, this application incorporates by reference in their entity the four previously filed applications.

It is understood that the herein described apparatus and methods are susceptible to various modifications and alternative constructions. There is no intention to limit the invention to the specific constructions described herein. To the contrary, the invention is intended to cover all modifications, alternative constructions, and equivalents falling within the scope and spirit of the invention. Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention.

What is claimed is:

1. A method for providing supplemental services to a customer of an existing telematics system managed by an existing telematics provider comprising:
   receiving from the existing telematics provider location and diagnostics data relating to at least one asset owned by the customer, in a non-proprietary format;
   parsing said location and diagnostics data;
   storing said location and diagnostics data;
   providing select location and diagnostics data to a third party application;
   obtaining an output from said third party application based on the select location and diagnostics data provided to the third party application;
   transmitting the output of said third party application such that said output is available to said customer, said output representing supplemental services to the customer.

2. The method of claim 1, further comprising obtaining additional data needed for said supplemental services, parsing the additional data, and storing the additional data;
   providing select additional data to a third party application in addition to providing said select location and diagnostics data;
   wherein said output from said third party application is based on select additional data in addition to said select location and diagnostics data.

3. The method of claim 1, wherein providing select location and diagnostics data to a third party application further comprises checking a routing table for a data format usable by said third party application and reformatting the select location and diagnostics data into the data format usable by said third party application.

4. The method of claim 1, wherein providing select location and diagnostics data to a third party application further comprises at least one of:
   selecting the location and diagnostics data to provide based on information stored in a routing table;
   transmitting said select data to a remote location where said third party application resides; providing the location and diagnostics data at time intervals based on information stored in a routing table; or
   providing the location and diagnostics data in a file format based on information stored in a routing table.

5. The method of claim 1, wherein transmitting the output of said third party application such that said output is available to said customer comprises at least one of
   transmitting the output to the existing telematics provider;
   making the output available to the customer via an internet-based user interface; or
   transmitting an output file to said customer.

6. The method of claim 1, wherein said third party application determines at least one of:
   the status of modifiable use conditions related to safety and wherein said output is a statistical metric of the relatively safety of an asset or fleet;
   modifiable use conditions related to fuel economy and wherein said output is a statistical metric of the relatively fuel economy of an asset or fleet;
   a performance indicator for an asset or fleet of assets and wherein said output is an actionable metric that affects the performance indicator;
   the status of undesired vehicle events and wherein said output is a statistical metric of the undesired vehicle events of an asset or fleet;
   the optimal routing of vehicles in a fleet and wherein said output are directions showing the optimal routing of the vehicles in the fleet; or
   an optimal schedule of service stops for a vehicle or fleet of vehicles and wherein said output is a schedule of service stops for a vehicle or fleet of vehicles.

7. A system comprising:
   an application programming interface configured to receive location and diagnostics data from an existing telematics provider, said location and diagnostics data relating to at least one asset owned by a customer and provided in a non-proprietary format;
   a data warehouse configured to store said location and diagnostics data and for receiving output data from a third party application, said output data including at least some of said location and diagnostic data that was transmitted to said third party application by said application programming interface and processed by said third party application;
   wherein said data warehouse is configured to make said output data of said third party accessible by said customer, said output data including one or more supplemental services for said customer.

8. The system of claim 7, wherein said application programming interface is configured to receive additional data for providing said supplemental services to said customer and said data warehouse is configured to store said additional data; and
   wherein said third party application is configured to process at least some of said additional data and said at least some of said location and diagnostics data and to provide an output based on said at least some of said additional data and said at least some of said location and diagnostics data.

9. The system of claim 7, wherein said application programming interface is configured to check a routing table to determine a data format that is usable by said third party application, and wherein said application programming interface is configured to reformat said at least some of said location and diagnostics data into said data format that is usable by said third party application before said application programming interface causes transmitting of said at least some of said select location and diagnostics data to said third party application.

10. The system of claim 7, wherein said application programming interface is configured to transmit said at least some of said location and diagnostics data to a remotely located third party application and wherein said application programming interface is configured to check a routing table to determine at least one of the following:
    which said location and diagnostics data to send to said third party application,
    which said at least some of said location and diagnostics data to send to said third party application, or
    a file format in which said at least some of said location and diagnostics data is to be sent to said third party application.

11. The system of claim 7, wherein said application programming interface is configured to transmit said output data of said third party application to at least one of said existing telematics provider, said customer via an internet-based user interface, or to said customer in an output file.

12. A method for providing supplemental services to a customer of an existing telematics system managed by an existing telematics provider comprising:
    receiving data from a portable device located on an asset owned by the customer;
    parsing said data;
    storing said data;
    providing select data to a third party application;

obtaining an output from said third party application based on the select data provided to the third party application;

transmitting the output of said third party application such that said output is available to said customer, said output representing supplemental services to the customer.

13. The method of claim 12, wherein said data received from said portable device is in a proprietary format and further comprising reformatting said data in a proprietary format received from said portable device to data in a non-proprietary format before storing said data.

14. The method of claim 12, further comprising checking a routing table for the data format usable by said third party application and wherein said data received from said portable device is reformatted into a form usable by said third party application before said data is provided to said third party application.

15. The method of claim 12, wherein transmitting the output of said third party application to the customer comprises transmitting the output to the existing telematics provider, making the output available to the customer via an internet-based user interface, transmitting an output file to said customer, or transmitting an output file to said portable device, and wherein transmitting an output file to said customer or said portable device comprises checking a routing table for a data format usable by said customer or said portable device and reformatting said output to a format usable by said customer or said portable device before transmitting said output file.

16. The method of claim 12, further comprising:
   obtaining additional data needed for said supplemental services, parsing the additional data, and storing the additional data;
   providing select additional data to a third party application in addition to providing said select data;
   wherein said output from said third party application is based on select additional data in addition to said select data.

17. The method of claim 12, further comprising receiving from the existing telematics provider location and diagnostics data relating to at least one asset owned by the customer, parsing the location and diagnostics data, and storing the location and diagnostics data;
   providing select location and diagnostics data to a third party application in addition to providing said select data.

18. The method of claim 12, further comprising receiving from the existing telematics provider location and diagnostics data relating to at least one asset owned by the customer, parsing the location and diagnostics data, and storing the location and diagnostics data;
   providing select location and diagnostics data to a third party application in addition to providing said select data and select additional data;
   wherein said output from said third party application is based on select location and diagnostics data in addition to said select data and said select additional data.

19. The method of claim 12, wherein said third party application determines at least one of:
   the status of modifiable use conditions related to safety and wherein said output is a statistical metric of the relatively safety of an asset or fleet;
   the status of modifiable use conditions related to fuel economy and wherein said output is a statistical metric of the relatively fuel economy of an asset or fleet;
   a performance indicator for an asset or fleet of assets and wherein said output is an actionable metric that affects the performance indicator;
   the status of undesired vehicle events and wherein said output is a statistical metric of the undesired vehicle events of an asset or fleet;
   the optimal routing of vehicles in a fleet and wherein said output are directions showing the optimal routing of the vehicles in the fleet, or an optimal schedule of service stops for a vehicle or fleet of vehicles and wherein said output is a schedule of service stops for a vehicle or fleet of vehicles.

20. A system of an existing telematics system managed by an existing telematics provider comprising:
   an application programming interface configured to receive portable device data from one or more portable devices located on an asset owned by a customer; and
   a data warehouse configured to store said portable device data;
   wherein said application programming interface also is configured to transmit a selected portion of said portable device data to a third party application for processing into output data;
   wherein said data warehouse is configured to store said output data of said third party application and to provide access to said output data to said customer, said output data representing supplemental services to the for said customer.

21. The system of claim 20, wherein said portable device data received from said one or more portable devices is in a proprietary format, and wherein said application processing interface is configured to reformat said portable device data in said proprietary format to reformatted data that is in a non-proprietary format before said data warehouse stores said reformatted data.

22. The system of claim 20, wherein said application processing interface is configured to check a routing table for a data format that is usable by said third party application and wherein said application processing interface is configured to reformat said portable device data into a form that is usable by said third party application before said portable device data is provided to said third party application.

23. The system of claim 20, wherein said data warehouse is configured to provide access to said output data to said customer by at least one of:
   transmitting said output data to an existing telematics provider,
   making said output data available to said customer via an internet-based user interface,
   transmitting an output file to said customer by checking a routing table for a data format that is usable by said customer or said portable device and reformatting said output data to a format that usable by said customer or said portable device before transmitting said output file, or
   transmitting an output file to said portable device.

24. The system of claim 20, wherein said application processing interface is configured to receive additional data for said supplemental services and said data warehouse is configured to store said additional data, further wherein said application processing interface is configured to provide a selected portion of said additional data to said third party application in addition to providing said selected portion of said portable device data to said third party application; so that said third party application can provide said output data based on said selected portion of said additional data in addition to said selected portion of said portable device data.

25. The system of claim 20, wherein said application processing interface is configured to receive location and diagnostics data from an existing telematics provider that relates to at least one asset owned by said customer, and wherein said data warehouse is configured to store said location and diagnostics data in said data warehouse; and wherein said application processing interface is configured to provide a selected portion of said location and diagnostics data to said third party application in addition to said selected portion of said portable device data.

26. The system of claim 20, wherein said application processing interface is configured to receive location and diagnostics data from an existing telematics provider that relates to at least one asset owned by said customer, and wherein said data warehouse is configured to store said location and diagnostics data;

wherein said application processing interface is configured to provide a selected portion of said location and diagnostics data to said third party application in addition to said selected portion of said portable device data and a selected portion of additional data to be provided to said third party application; so that said third party application can provide said output data that is based on said selected portion of said location and diagnostics data, said selected portion of said additional data, and said selected portion of said portable device data.

27. A system comprising:
a server computer configured to provide an application programming interface that is configured to receive telematics data from one or more portable devices, the telematics data obtained from one or more mobile assets using the one or more portable devices;
a computer storage medium configured to receive and store the telematics data from the application programming interface of the server computer;
wherein the application programming interface also is configured to transmit the telematics data to one or more third party applications for processing the telematics data into output data and the computer storage medium is configured to store and provide access to the output data.

28. The system of claim 27, wherein the application programming interface is configured to receive the telematics data as diagnostic data of the one or more mobile assets and location data representative of one or more geographic locations of the one or more mobile assets.

29. The system of claim 27, wherein the application programming interface is configured to receive the telematics data in a first format and to convert the telematics data from the first format to different, second format for transmission to the one or more third party applications.

30. The system of claim 29, wherein the first format is a first proprietary format that is not readable by at least one of the one or more third party applications and the second format is at least one of a different, second proprietary format or an open format that is readable by the at least one of the one or more third party applications.

31. The system of claim 27, wherein the computer storage medium includes a routing table that stores at least one of a data format to which the telematics data is to be converted for the one or more third party applications, a frequency at which the telematics data is to be transmitted by the application programming interface to the one or more third party applications, a destination to which the telematics data is to be transmitted by the application programming interface, or an encryption that is to be used by the application programming interface in encrypting the telematics data.

32. The system of claim 31, wherein one or more of the portable devices are associated with one or more different telematics hardware providers, and the routing table of the computer storage medium includes an association between each of the one or more different telematics hardware providers and at least one of the data format to which the telematics data is to be converted for the third party application, the frequency at which the telematics data is to be transmitted by the application programming interface to the one or more third party applications, the destination to which the telematics data is to be transmitted by the application programming interface, or the encryption that is to be used by the application programming interface in encrypting the telematics data.

33. The system of claim 27, wherein one or more of the portable devices are associated with one or more different telematics hardware providers, and the application programming interface is configured to transmit the telematics data obtained by the one or more of the portable devices back to the one or more different telematics hardware providers associated with the one or more portable devices.

34. The system of claim 27, wherein one or more of the portable devices are associated with one or more different telematics hardware providers, and the application programming interface is configured to transmit the output data associated with the telematics data obtained by the one or more of the portable devices back to the one or more different telematics hardware providers associated with the one or more portable devices.

35. The system of claim 27, wherein the application programming interface is configured to transmit the telematics data to the one or more third party applications as the telematics data is received from the portable devices.

36. The system of claim 27, wherein the computer readable medium includes a data transmission schedule having one or more different schedules at which the one or more third party applications are to receive the telematics data, and wherein the application programming interface is configured to transmit the telematics data to the one or more third party applications at the schedules associated with the one or more third party applications.

37. The system of claim 27, wherein the application programming interface is configured to receive the telematics data as data relating to a sensor associated with the one or more mobile assets, the sensor including at least one of a cargo sensor, a door sensor, or a temperature sensor.

38. The system of claim 27, wherein the computer storage medium is configured to store additional data and the application programming interface is configured to use the additional data with the output data from the one or more third party applications to generate analyzed data.

39. The system of claim 38, wherein the computer storage medium is configured to store at least one of expected vehicle stops of the one or more mobile assets, expected stop time periods of the one or more mobile assets, accidents of the one or more mobile assets, or schedules of the one or more mobile assets as the additional data.

40. The system of claim 39, wherein the computer storage medium is configured to receive at least one of schedules for the one or more mobile assets, route plans for the one or more mobile assets, or fuel efficiencies of the one or more mobile assets as the analyzed data from the one or more third party applications.

* * * * *